(12) United States Patent
Harman et al.

(10) Patent No.: US 10,031,683 B2
(45) Date of Patent: *Jul. 24, 2018

(54) PROVIDING SERVICE ADDRESS SPACE FOR DIAGNOSTICS COLLECTION

(71) Applicant: International Business Machines Corporation, Armonk, NY (US)

(72) Inventors: David J. Harman, Eastleigh (GB); Neil W. Leedham, Bursledon (GB); Kim P. Walsh, Fair Oak (GB); Andrew Wright, Chandlers Ford (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/630,669

(22) Filed: Jun. 22, 2017

(65) Prior Publication Data

US 2017/0285985 A1 Oct. 5, 2017

Related U.S. Application Data

(63) Continuation of application No. 15/249,239, filed on Aug. 26, 2016, now Pat. No. 9,696,926, which is a (Continued)

(30) Foreign Application Priority Data

Aug. 10, 2012 (GB) .................................. 1214323.6

(51) Int. Cl.
*G06F 12/00* (2006.01)
*G06F 9/26* (2006.01)
(Continued)

(52) U.S. Cl.
CPC ............ *G06F 3/0619* (2013.01); *G06F 3/065* (2013.01); *G06F 3/067* (2013.01); *G06F 3/0659* (2013.01);
(Continued)

(58) Field of Classification Search
CPC ...... G06F 3/0619; G06F 3/0659; G06F 3/065; G06F 3/067; G06F 9/3867; G06F 12/063;
(Continued)

(56) References Cited

U.S. PATENT DOCUMENTS 5,133,057 A 7/1992 Ishii et al.
5,201,039 A 4/1993 Sakamura
(Continued)

FOREIGN PATENT DOCUMENTS

CN 102541805 7/2012
EP 0762280 3/1997
(Continued)

OTHER PUBLICATIONS

Schauser, Klaus E., et al.; Exploiting the Capabilities of Communications Co-processors; IPPS '96 Proceedings of the 10th International Parallel Processing Symposium; 1996.
(Continued)

*Primary Examiner* — Yaima Rigol
*Assistant Examiner* — Shane Woolwine
(74) *Attorney, Agent, or Firm* — James L. Baudino

(57) ABSTRACT

A method and technique are provided for providing a service address space. The method includes providing a service co-processor with a service address space attached to a main processor. The main processor is provided with a main address space. Instructions that modify the main address space are intercepted, storage delta packets are generated
(Continued)

based on intercepted instructions, and the storage delta packets are sent to a service co-processor maintaining a service address space.

20 Claims, 5 Drawing Sheets

Related U.S. Application Data continuation of application No. 14/100,046, filed on Dec. 9, 2013, now Pat. No. 9,448,912, which is a continuation of application No. 13/961,491, filed on Aug. 7, 2013, now Pat. No. 9,448,911.

(51) Int. Cl.
| | | |
|---|---|---|
| *G06F 9/34* | (2018.01) | |
| *G06F 3/06* | (2006.01) | |
| *G06F 11/34* | (2006.01) | |
| *G06F 12/06* | (2006.01) | |
| *G06F 11/07* | (2006.01) | |
| *G06F 9/38* | (2018.01) | |
| *G06F 12/0842* | (2016.01) | |
| *G06F 11/36* | (2006.01) | |

(52) U.S. Cl.
CPC ........ *G06F 9/3867* (2013.01); *G06F 11/0724* (2013.01); *G06F 11/0778* (2013.01); *G06F 11/3476* (2013.01); *G06F 12/063* (2013.01); G06F 11/34 (2013.01); G06F 11/3648 (2013.01); G06F 12/0615 (2013.01); G06F 12/0842 (2013.01); G06F 2212/1032 (2013.01)

(58) Field of Classification Search
CPC ............. G06F 12/0615; G06F 12/0842; G06F 11/0778; G06F 11/0724; G06F 11/3476; G06F 11/3648; G06F 11/34; G06F 2212/1032

USPC ............ 714/30, 31, 34, 38.11; 711/113, 141, 711/170, 209

See application file for complete search history.

(56) References Cited

U.S. PATENT DOCUMENTS

| | | |
|---|---|---|
| 7,287,147 B1 | 10/2007 | Hudepohl et al. |
| 7,444,553 B2 | 10/2008 | Kimura |
| 7,454,550 B2 | 11/2008 | Benbow et al. |
| 7,707,395 B2 | 4/2010 | Das |
| 7,865,703 B2 | 1/2011 | Chen et al. |
| 2004/0103263 A1 | 5/2004 | Colavin et al. |
| 2005/0060577 A1 | 3/2005 | Barrett et al. |
| 2008/0022077 A1 | 1/2008 | Thekkath et al. |
| 2008/0162900 A1 | 7/2008 | Rolfsmeier et al. |
| 2008/0222389 A1 | 9/2008 | Bruce et al. |
| 2009/0187394 A1 | 7/2009 | Lin et al. |
| 2010/0077258 A1 | 3/2010 | Lee et al. |
| 2010/0251245 A1 | 9/2010 | Stenson et al. |
| 2011/0153690 A1 | 6/2011 | Allen et al. |

FOREIGN PATENT DOCUMENTS

| | | |
|---|---|---|
| GB | 2301914 | 12/1996 |
| GB | 2350216 | 11/2000 |
| WO | 2002086730 | 10/2002 |

OTHER PUBLICATIONS

Ienne, Paolo, et al.; Customizable Embedded Processors—Design Technologies and Applications; Chapter 9 (Coprocessor Generation from Executable Code); pp. 214-218; 2007.
Search Report based on UK Patent Application No. 1214323.6; dated Nov. 30, 2012.
International Search Report and Written Opinion; International Application No. PCT/IB2013/056113; dated Feb. 6, 2014.

PROVIDING SERVICE ADDRESS SPACE FOR DIAGNOSTICS COLLECTION

BACKGROUND

Computing systems require memory in order to function. This computer memory is referenced by address and the full range of memory available to the system is known as the address space. When a problem with a computer system is being investigated the contents of this address space is of vital importance as it shows the state of the processes within the system.

In order to access the contents of the address space for diagnostic purposes a system dump can be generated or carried out. However, a system dump is a time-consuming process that causes a significant delay to other processes within the system.

In a busy production environment this dump delay can cause numerous secondary problems, such as tasks timing-out and themselves abnormally ending (ABENDing) causing further system dumps to be generated or carried out, and work backing-up to the point where the system becomes overloaded. The knock-on effect of these dump delays can be very serious, often more serious than the problem for which the dump was originally carried out. In extreme cases, the system may not recover back to a normal running state without a complete system reset.

The dump delays may also cause the system to appear unresponsive to the end-user, and the build-up of unprocessed work may prevent new work from being accepted.

Due to the problems described, it is common practice for customers to disable certain system dumps from being carried out at all, so that critical diagnostic information is lost. All these problems lead to reduced customer satisfaction and increased service costs.

In addition to system dumps, other diagnostic tools are limited by the current machine architecture because of the performance overhead of employing them. One example is system tracing, where trace records are written out at pre-defined points in the processing, containing partial dumps of storage for particular areas of interest. The performance overhead of taking such trace records often means it is not viable to run with full tracing enabled in a production system, such that once again, vital diagnostics are lost if a failure occurs and problem determination is required.

BRIEF SUMMARY

According to one aspect of the present invention, a method and technique for providing service address space is disclosed. The method includes providing a service co-processor with a service address space attached to a main processor. The main processor is provided with a main address space. Instructions that modify the main address space are intercepted, storage delta packets are generated based on intercepted instructions, and the storage delta packets are sent to a service co-processor maintaining a service address space.

The described aspects of the invention provide the advantage of relieving a main processor of diagnostic service functions resulting in avoiding processing delays.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
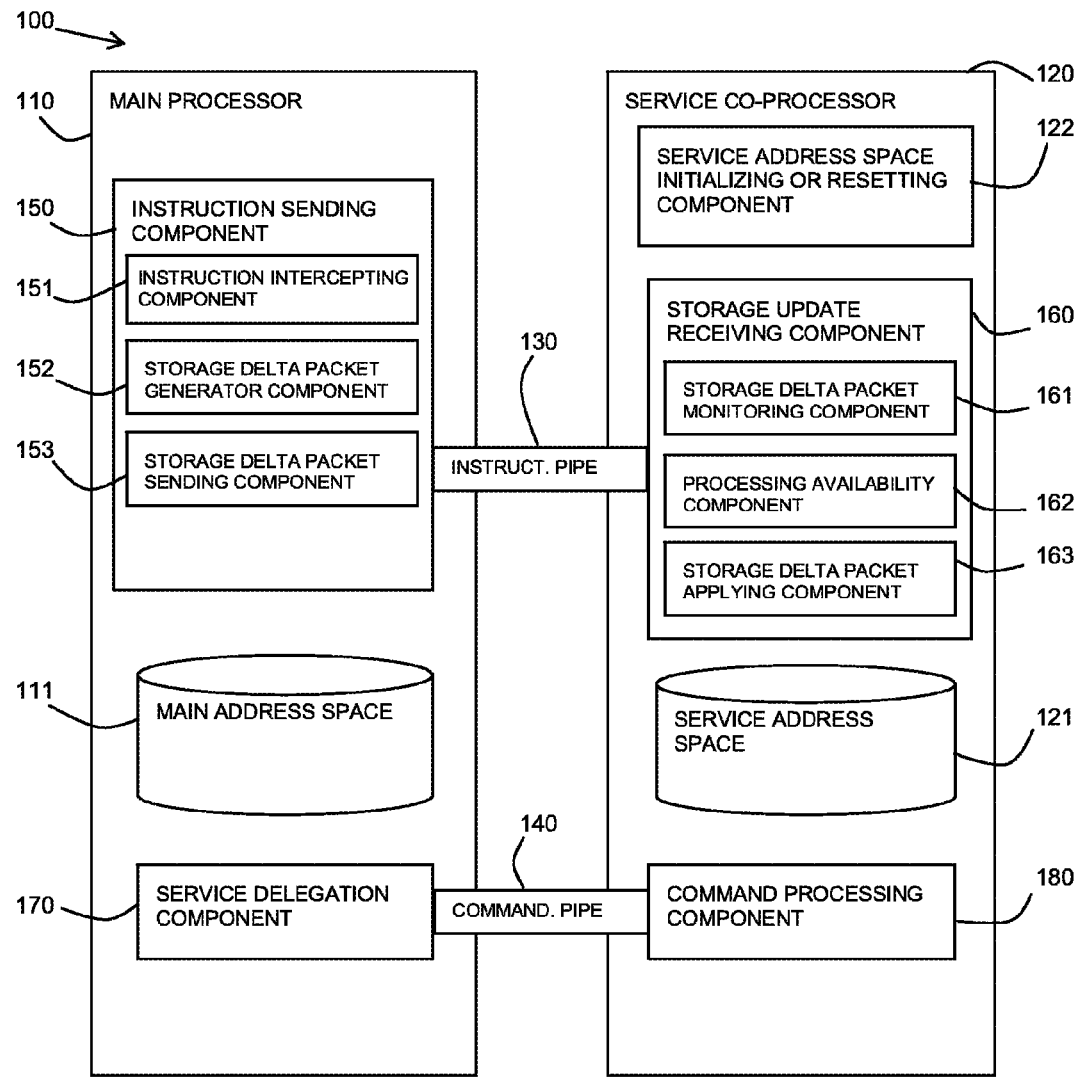
FIG. 1 is block diagram of an example embodiment of a system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and system are provided for a service co-processor to enable the efficient collection of diagnostics. The described system provides an extension to a machine architecture to introduce a service co-processor and service address space, and instruction and command pipes. The processing of the main processor is virtually unaffected by the presence of the service co-processor in normal running.

The service co-processor is an adapted version of the main processor with additional service functionality accessed by an extended service instruction set. The service co-processor is connected to the main processor by an instruction pipe and a command pipe. The service co-processor has its own independent copy of the address space, referred to as the service address space. The service address space may be initialized by copying the main address space, using a new service address space initialize instruction, for example, in the form of a SASI (Shugart Associates System Interface) instruction.

The main processor may be adapted so that all instructions that modify address space storage cause a storage delta packet (also referred to as a storage update packet) to be placed on the instruction pipe to be passed to the service co-processor. The storage delta packet may contain the address and new value of the modified storage, plus associated information such as the contents of the status register, register values, and system clock.

The service co-processor may take work from the instruction pipe and may apply the storage deltas to the service address space. There may be multiple storage delta packets in the instruction pipe at any one time such that the service co-processor runs behind the main processor, and the service address space contains an historical copy of the main address space. The service co-processor thus runs asynchronous to the main processor, having no requirement to keep pace with it, its work being queued up in a first in first out (FIFO) order in the instruction pipe.

The main processor may delegate service functions or diagnostic services to the service co-processor by placing a command packet on the command pipe. Command packets may be processed by the service co-processor at a higher priority to storage delta packets. For example, such service functions or diagnostic services may include: the generating of a system dump, a service trace, the cutting of system trace records, and the gathering of monitoring and statistics data. Command packets may result in immediate or delayed actions on the service co-processor, for example, the command to generate or initiate a system dump at a particular value of the system clock would be actioned when the storage delta packet pertaining to that time stamp was processed.

Referring to FIG. 1, an example embodiment of the described system 100 is shown. A main processor 110 is provided with a main address space 111. A service co-processor 120 is provided with a service address space 121 and the service co-processor 120 is attached to the main processor 110 by an instruction pipe 130 and a command pipe 140.

The main processor 110 may include an instruction sending component 150 for sending instructions to the service co-processor 120. The instruction sending component 150 may include an instruction intercepting component 151 for intercepting instructions that modify the main address space 111. The instruction sending component 150 may include a storage delta packet generator component 152 for generating a storage delta packet which may contain the address and new value of the modified storage, plus associated information such as the contents of the status register, register values, and system clock. The instruction sending component 150 may include a storage delta packet sending component 153 for sending the generated storage delta packet to the service co-processor 120 via the instruction pipe 130.

The service co-processor 120 may include a service address space initiating or resetting component 122. The service address space initializing or resetting component 122 may initialize the service address space 121 of the service co-processor 120 by copying the main address space 111. The service address space initiating or resetting component 122 may also reset the service address space 121, for example, after a system dump, by again copying the contents of the main address space 111 to the service address space 121.

The service co-processor 120 may include a storage update receiving component 160 for taking work from the instruction pipe 130 and applying to the service address space 121. The storage update receiving component 160 may include a storage delta packet monitoring component 161 for monitoring the instruction pipe 130 for new storage delta packets. A processing availability component 162 may be provided for determining if the service co-processor 120 has sufficient processing to carry out the update. If it does not have sufficient processing availability, the storage delta packet may wait in a queue in the instruction pipe.

The storage update receiving component 160 may include a storage delta packet applying component 163 for applying a storage delta packet to the service address space 121.

The main processor 110 may also include a service delegation component 170 for delegating service functions to the service co-processor 120, for example, the generating or initiation of a system dump, or system tracing. The service delegation component 170 may send command packets via the command pipe 140 to a command processing component 180 of the service co-processor 120. The command processing component 180 may activate the command immediately or may wait until a required time stamp of the service address space 121 before processing the command.

The service co-processor 120 is concerned with updating address space storage and consequently has less work to do than the main processor 110. This spare capacity is available to perform service functions delegated by the main processor 110, such as generating or initiating system dumps, and to execute commands in the service instruction set.

Figure 2:
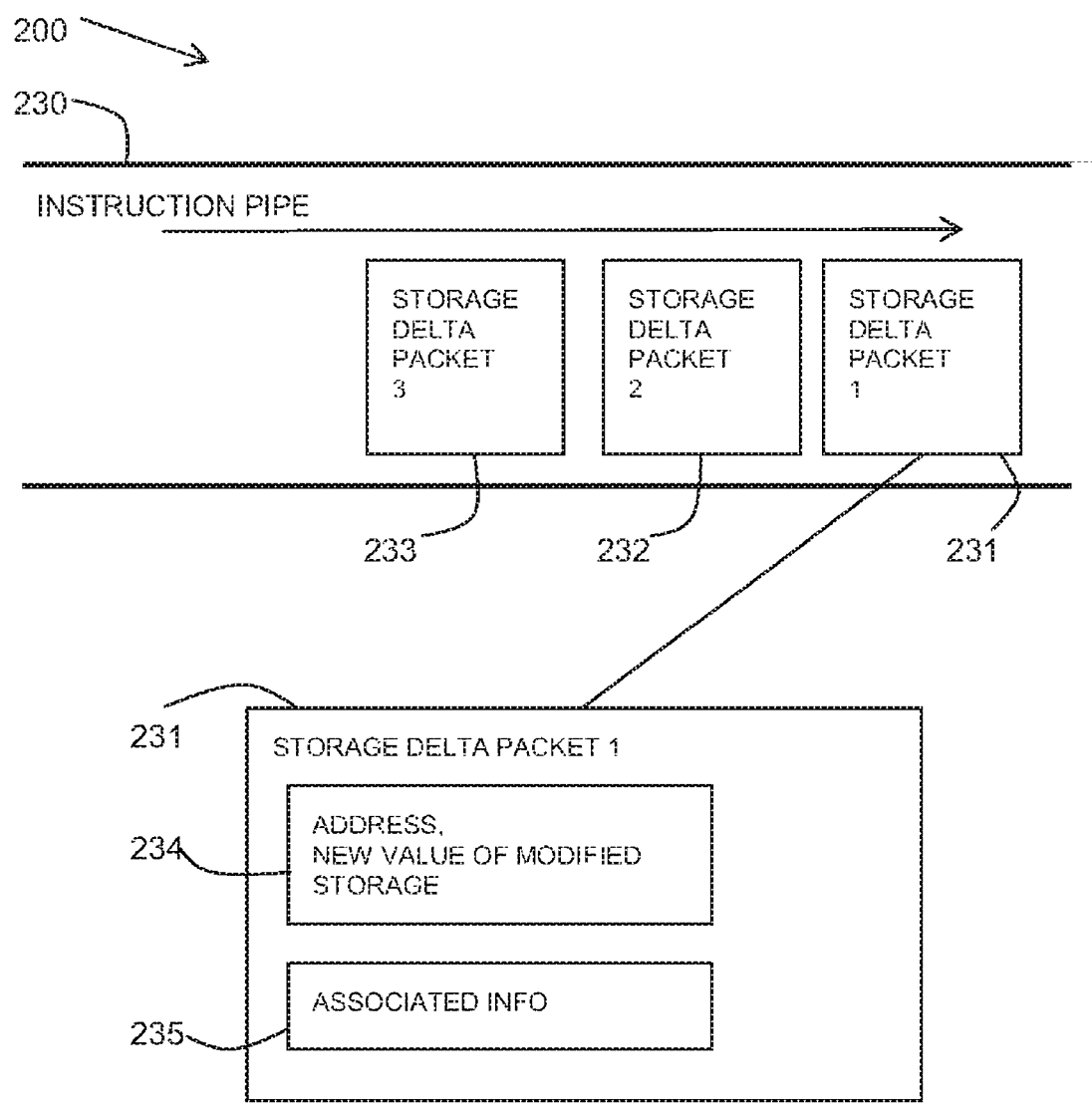
FIG. 2 is a schematic diagram of an aspect of the system of FIG. 1 in accordance with the present invention.

Referring to FIG. 2, a schematic diagram 200 shows an example of detail of the described system. An instruction pipe 230 between a main processor and a service co-processor is shown with multiple storage delta packets 231-233 queued for processing by the service co-processor. A storage delta packet 231 is shown as including primary information 234 in the form of the address and a new value of the modified storage at the address, and secondary information 235 in the form of status register, register values, and system clock. The system clock results in the service address space recording the time of updates as applied to the main address space, thereby providing an historical copy of the main address space and allowing the service co-processor to work asynchronously from the main processor.

The command pipe may be processed by the service co-processor at a higher priority to the instruction pipe, so the service address space will never be updated past the point at which the dump should be taken.

The service co-processor architecture may be incorporated in future system designs. However, existing computer systems may also be adapted by providing the service co-processor and associated storage in a stand-alone system connected to the main processor by a high-speed link such as a fiber-optic cable.

The stand-alone service co-processor system may be a completely purpose-built design, with the service instruction set 'built-in' to the processor. Alternatively it could be built on a standard machine platform with a virtual service instruction set supported by the service co-processor application software.

The instruction and command pipes may be carried on the high-speed link. A stand-alone service co-processor may require an upgrade to the microcode/millicode of the main processor to place the storage delta packets and command packets on the instruction and command pipes respectively.

Another advantage of a stand-alone service co-processor is that it would still be available to provide critical diagnostics should the main processor system suffer a catastrophic failure.

The described system assists with the existing issues pertaining to problem determination and diagnostic gathering/FFDC (First Failure Data Capture) for customers. As systems are required to run without outages and for extended periods of time ("24/7"), any ability to assist with the gathering of diagnostic information in a timely and unobtrusive manner is vital to maintain an ability to resolve problems and out-of-line situations for customers.

As the architecture described herein would always be available and actively capturing system information and the full range of available diagnostic data, it would ensure that FFDC was always enabled and active when problems occurred. This would prevent the common situation existing today, where customers often run without diagnostic data capture active, and hence are forced to recreate a failure in order to gather the necessary information for problem resolution. This is in fact a best case scenario; often problems cannot be reproduced and so have to remain undiagnosed until the next production outage.

Modern computing systems have become very complex and their implementation varies greatly from one system to another, each system implementing a subset of the potential features. A discussion of the described service co-processor architecture with reference to all the potential system configurations would be unwieldy, raising numerous configuration specific questions. Similarly, the described system could have multiple implementations, having varying levels of function and complexity.

In the described system configuration, the entire address space maps directly to 'real' system memory, there is no concept of virtual storage. Furthermore, only one processor may have access to the address space, and processing within the address space is single-threaded.

Figure 3:
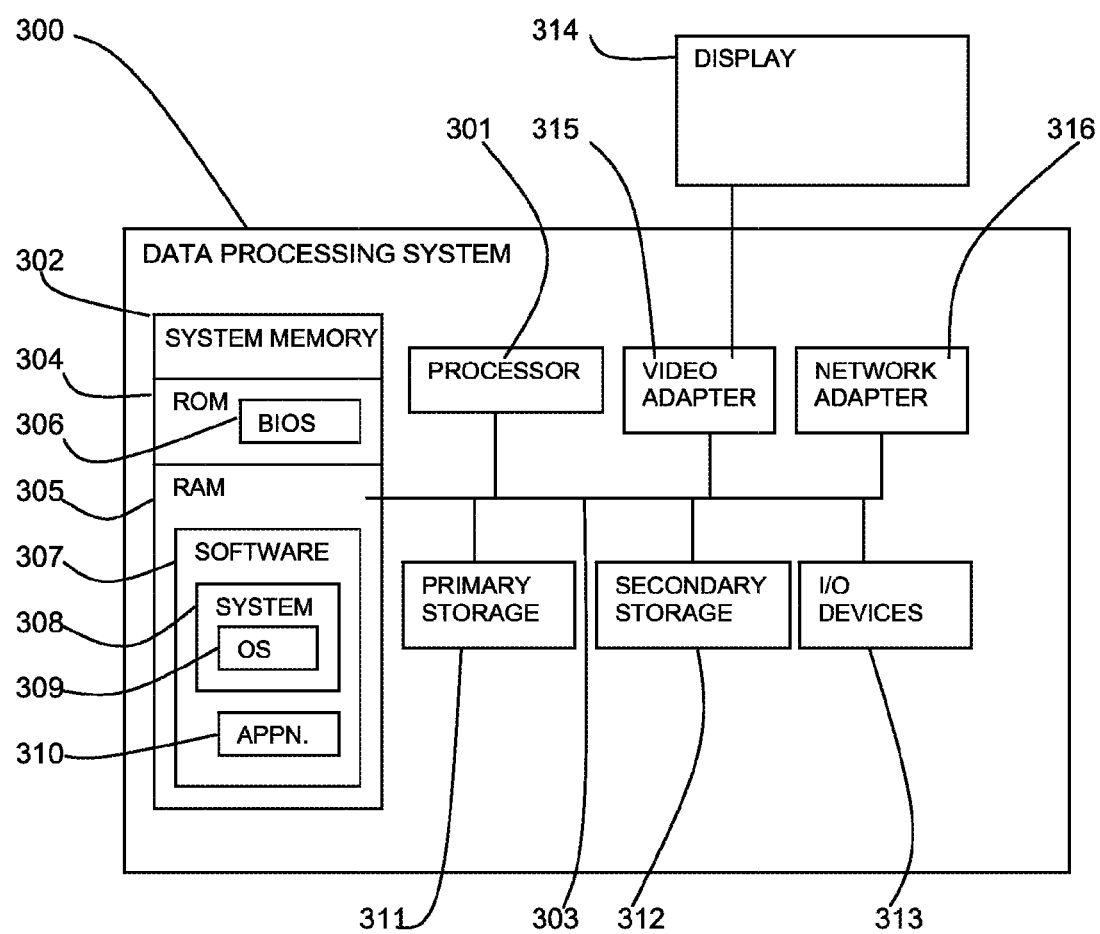
FIG. 3 is a block diagram of an embodiment of a computer system in which the present invention may be implemented.

Referring to FIG. 3, an exemplary system for implementing aspects of the invention includes a data processing system 300 suitable for storing and/or executing program code including at least one processor 301 coupled directly or indirectly to memory elements through a bus system 303. The memory elements may include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308/309. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 may be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Figure 4:
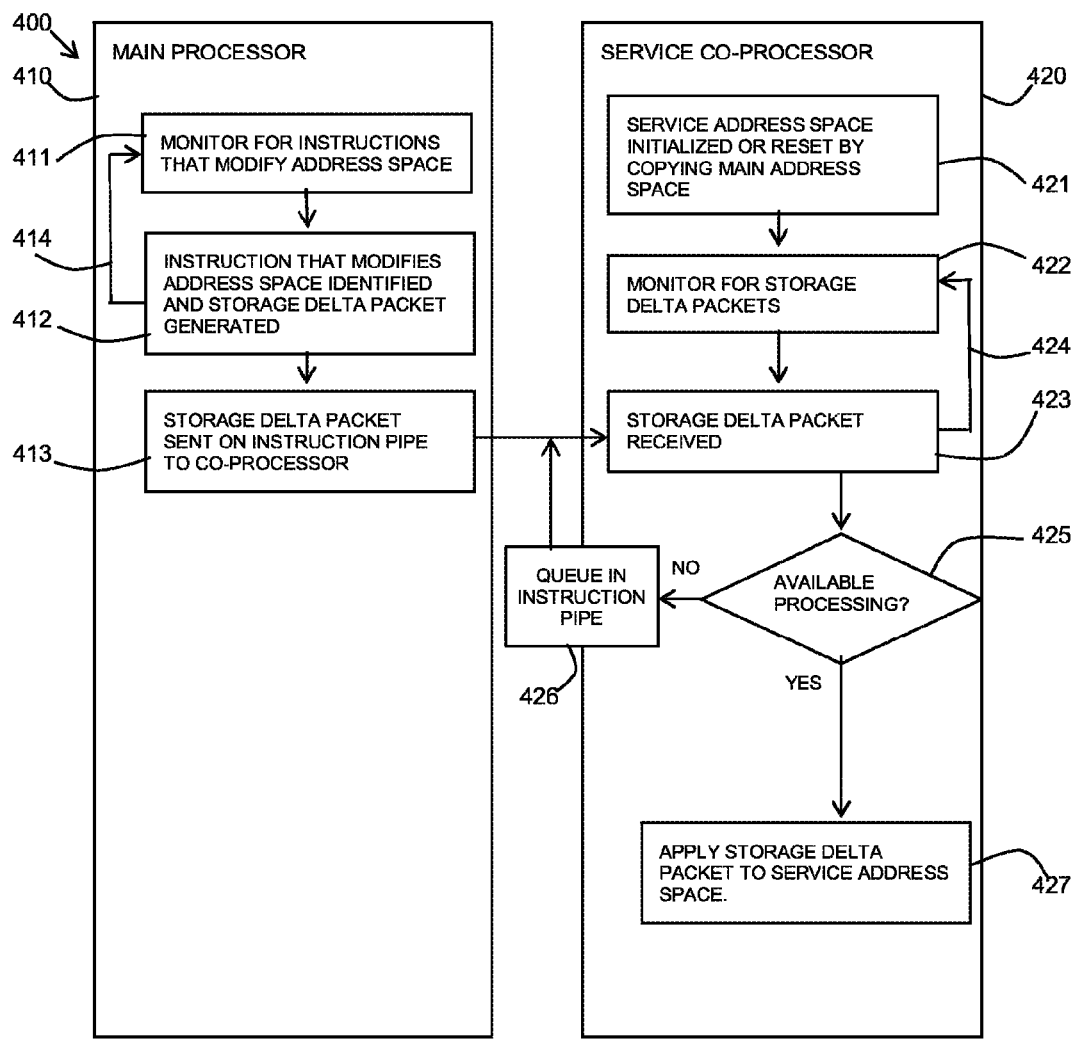
FIG. 4 is a flow diagram of an example embodiment of an aspect of a method in accordance with the present invention.

Referring to FIG. 4, a flow diagram 400 shows an embodiment of a first aspect of the described method of processing address space updates. The flow diagram 400 shows the processing carried out in the main processor 410 and a service co-processor 420.

The main processor 410 may monitor 411 for instructions that modify the main address space. If an instruction that modifies the main address space is identified 412, a storage delta packet is generated. The storage delta packet may be sent 413 on an instruction pipe to the service co-processor 420. The monitoring 411 for instructions continues as shown by the method loop 414.

At the service co-processor 420, a service address space is initialized 421 or reset by copying the main address space.

The service co-processor 420 monitors 422 for storage delta packets arriving on the instruction pipe. A storage delta packet may be received 423 and the monitoring continues 424 for a next storage delta packet to arrive. It may be determined 425 if there is available processing for a received storage delta packet. If there is not sufficient processor availability, the storage delta packet remains queued 426 in the instruction pipe. If there is sufficient processor availability, the storage delta packet is applied 427 to the service address space.

One example application of the described architecture is the delegation of a system dump request from the main to the service co-processor. This delegation may avoid the initial 'freeze-up' delay on the main processor whereby the whole system is frozen during the initial phase of dump processing.

A single system dump may be carried out on the service co-processor. Once this system dump is initiated, the service co-processor stops updating the service address space. Once the system dump has been taken on the service co-processor, it must be reset. This reset processing involves copying the contents of the main address space to the service address space and then re-starting the process of mirroring all storage updates to the service co-processor.

Figure 5:
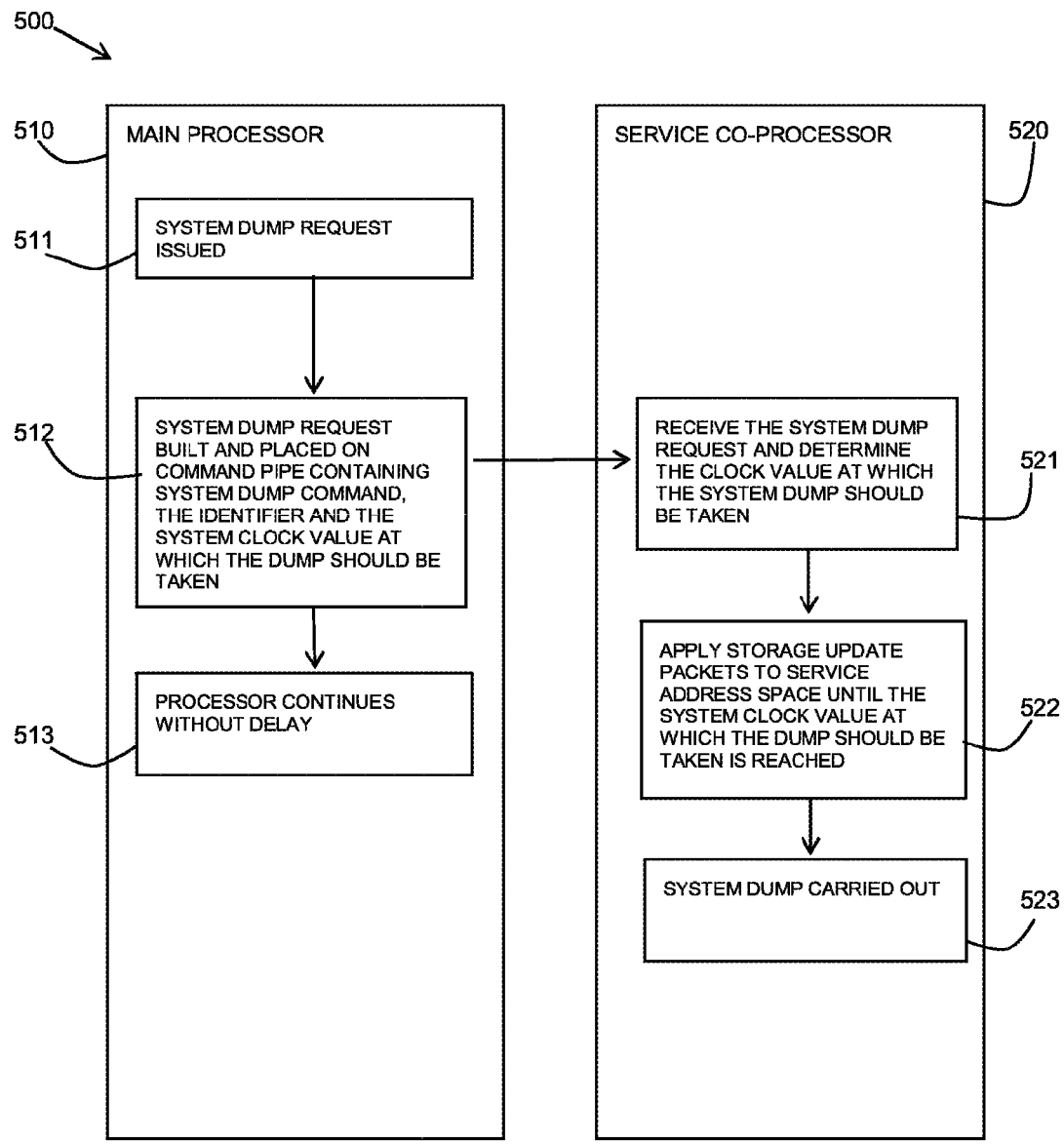
FIG. 5 is a flow diagram of an example embodiment of an aspect of a method in accordance with the present invention.

Referring to FIG. 5, a flow diagram 500 shows an example embodiment of a second aspect of the described method of carrying out a system dump request. The flow diagram 500 shows the processing carried out in the main processor 510 and a service co-processor 520.

The main processor 510 may issue 511 a system dump request. The main processor 510 may build 512 a system dump request and place it on a command pipe. The system dump request may contain: a system dump command, an identifier, and the system clock value at which time the dump should be initiated/processed. The main processor 510 may continue 513 its processing without any delay.

The service co-processor 520 may receive 521 the system dump request and may determine the clock value at which the system dump should be initiated/processed. The storage update packets may be applied 522 to the service address space until the system clock value at which the dump should be carried out is reached. The system dump is then carried out 523.

EXAMPLE

An example of a simple computer system as described above may be a safety-critical control system in a car, such as a 'brake-by-wire' controller, which might need to take a diagnostic dump whilst still providing full braking function. Such a system cannot afford to 'freeze-up' while it processes a system dump.

A brake-by-wire system in a car replaces traditional components such as the pumps, cylinders and belts with electronic sensors and actuators controlled by software. The safety critical nature of such systems means they have not been widely implemented in automobiles.

The storage update packet for such a system could look like this:

System clock value;
Address of updated storage;
Length of updated storage;
Value of updated storage.

This storage update packet may consist of fixed length fields for the system clock value, address and length of the updated storage, and a variable length field to contain the new value of the updated storage.

A system dump instruction packet may be as follows:
Command identifier for system dump command;
System clock value when dump should be carried out.

The service co-processor architecture avoids the long processing delays that can occur when the main processor has to undertake service functions such as taking a system dump and writing trace records. It also relieves the main processor from the above operations to avoid delays in other processes. The described system makes it practical for users to fully utilize service tools such as dump and trace in a production environment, as the performance overhead of doing so is almost completely eliminated from the main processor.

The described system also allows for the development of new service tools that would have been either impossible or impractical, to develop previously. This in turn greatly assists with problems involved in data gathering for FFDC and problem determination. The result will be improved problem resolution times and help restore customer satisfaction for out of line situations and outages.

A further benefit of the described system is the ability for a support team to log directly on to the service co-processor system to diagnose problems, accessing retained system dumps for immediate analysis in situations where similar access to production systems would not be authorized.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Improvements and modifications can be made to the foregoing without departing from the scope of the present invention.

What is claimed is:

1. A method for providing service address space, comprising: providing a main processor having provided with a main address space; intercepting instructions that modify the main address space; generating storage delta packets based on intercepted instructions; and sending the storage delta packets to a service co-processor, the storage delta packets generated having select information corresponding to the modified main address space, the service co-processor using the storage delta packets to maintain an independent copy of the main address space in the form of a service address space.

2. The method of claim 1, further comprising delegating collection of diagnostic data to the service co-processor.

3. The method of claim 1, further comprising sending a collection command from the main processor to the service co-processor for collection of data from the service address space.

4. The method of claim 1, further comprising, at the main processor:
monitoring for instructions that modify the main address space; and
sending the storage delta packets on an instruction pipe to the service co-processor.

5. The method of claim 1, further comprising, at the service co-processor:
monitoring an instruction pipe for the storage delta packets; and
applying the storage delta packets to the service address space.

6. The method of claim 1, further comprising:
queuing the storage delta packets in an instruction pipe from the main processor to the service co-processor such that the service co-processor runs behind the main processor; and
wherein the service address space contains a historical copy of the main address space.

7. The method of claim 1, wherein at least one of the storage delta packets includes:
a storage address to be updated;
a new value of storage to be updated; and
associated information including a system clock value.

8. The method of claim 3, further comprising prioritizing the collection command over the storage delta packets.

9. The method of claim 3, further comprising receiving the collection command over a command pipe from the main processor.

10. The method of claim 3, further comprising instructing the collection of diagnostic data at a particular system clock value.

11. The method of claim 3, further comprising:
receiving the collection command with a given system clock value; and
actioning the collection command at the service co-processor when a storage delta packet pertaining to the clock value is processed.

12. The method of claim 3, wherein the collection of diagnostic data includes one or more of the group of: a system dump, a system trace, and a collection of monitoring and statistics data.

13. The method of claim 3, further comprising after carrying out the collection of diagnostic data, the service co-processor resetting the service address space by copying the contents of the main address space to the service address space and re-starting the process of mirroring all storage updates to the service co-processor.

14. The method of claim 3, further comprising enabling direct access to service address registers of the service co-processor for analysis.

15. A method for providing service address space, comprising:
providing a service co-processor attached to a main processor, wherein the service co-processor has a service address space, wherein the main processor is provided with a main address space, wherein the service co-processor creates and maintains an independent copy of the main address space in the form of the service address space;
updating the service address space by receiving storage delta packets from the main processor and applying the storage delta packets to the service address space; and
performing diagnostic services by the service co-processor based on command packets received from the main processor.

16. The method of claim 15, further comprising delegating, by a service delegation component of the main processor, collection of diagnostic data to the co-processor.

17. The method of claim 15, further comprising prioritizing, by the service co-processor, the command packets over the storage delta packets.

18. The method of claim 15, further comprising performing, by the service co-processor, a service function at a particular value of a system clock.

19. The method of claim 15, further comprising initiating a service function based on a particular value of a system clock indicated in a respective command packet.

20. The method of claim 15, further comprising initiating a delayed service function in response to processing a storage delta packet having a time stamp corresponding to a particular system clock value.

* * * * *